(12) United States Patent
Deepak

(10) Patent No.: US 8,711,693 B2
(45) Date of Patent: Apr. 29, 2014

(54) GATEWAY CHANNEL UTILIZATION

(75) Inventor: Ladha Deepak, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 13/401,111

(22) Filed: Feb. 21, 2012

(65) Prior Publication Data

US 2013/0094377 A1    Apr. 18, 2013

(30) Foreign Application Priority Data

Oct. 14, 2011   (IN) .......................... 3544/CHE/2011

(51) Int. Cl.
| | |
|---|---|
| H04L 1/00 | (2006.01) |
| H04L 12/26 | (2006.01) |
| H04L 12/28 | (2006.01) |
| H04L 12/56 | (2011.01) |
| H04J 3/16 | (2006.01) |
| H04J 3/22 | (2006.01) |
| H04W 76/02 | (2009.01) |
| H04L 29/06 | (2006.01) |

(52) U.S. Cl.
CPC .......... *H04W 76/02* (2013.01); *H04L 65/1053* (2013.01); *H04L 65/1043* (2013.01); *H04L 65/1013* (2013.01); *H04L 65/10* (2013.01); *H04L 65/102* (2013.01); *H04L 65/1033* (2013.01)
USPC ............ 370/230; 370/389; 370/465; 455/450

(58) Field of Classification Search
CPC ............. H04W 76/02; H04L 65/1053; H04L 65/1043; H04L 65/1013; H04L 65/10; H04L 65/102; H04L 65/1033; H04L 65/1023; H04L 65/1045
USPC ......... 370/230, 252, 254, 328, 329, 338, 347, 370/351, 389, 465, 468; 455/455, 450, 522
See application file for complete search history.

(56) References Cited

U.S. PATENT DOCUMENTS

| | | | |
|---|---|---|---|
| 7,468,951 | B2 | 12/2008 | Qian et al. |
| 7,602,761 | B2 | 10/2009 | Lin et al. |
| 8,004,979 | B2 | 8/2011 | Benveniste |
| 2006/0116128 | A1 | 6/2006 | Benveniste |

OTHER PUBLICATIONS

Pan, H. et al., "An Analysis of the Channel Utilization for Call Admission Control in Voice Over WLAN", IWCMC '06, Jul. 3-6, 2006, ACM.

*Primary Examiner* — Kwang B Yao
*Assistant Examiner* — Adam Duda

(57) ABSTRACT

Voice call entries for voice calls handled by a gateway may be stored in a database. Determining channel utilization in the gateway may include determining whether a gateway channel was used during a voice call based on a corresponding voice call entry. A determination may be made as to whether the voice call is complete or active. Also, the channel name is determined and the channel usage duration of the voice call since the last channel utilization determination is calculated. Also, the channel name is mapped with the channel usage duration, and the mapping may be stored in the database.

15 Claims, 4 Drawing Sheets

GATEWAY CHANNEL UTILIZATION

CLAIM FOR PRIORITY

The present application claims priority under 35 U.S.C 119 to Indian application number 3544/CHE/2011, filed on Oct. 14, 2011, which is incorporated by reference in its entirety.

BACKGROUND

In the earlier days, the voice data was typically carried over the public switched telephone network (PSTN), which consisted of telephone lines, fiber optic cables, cellular networks, communications satellites, and undersea telephone cables, all inter-connected by switching centers. The arrival of the Internet added another dimension to the movement of voice from one part of the globe to another. In an Internet Protocol-based network (IP network) data packets (containing, for instance, voice, video, etc.) are used to communicate between two nodes. To connect diverse networks like the PSTN and an IP-based network, "gateways" have been developed that as links between them. A gateway is a network point that acts as an entrance to another network.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
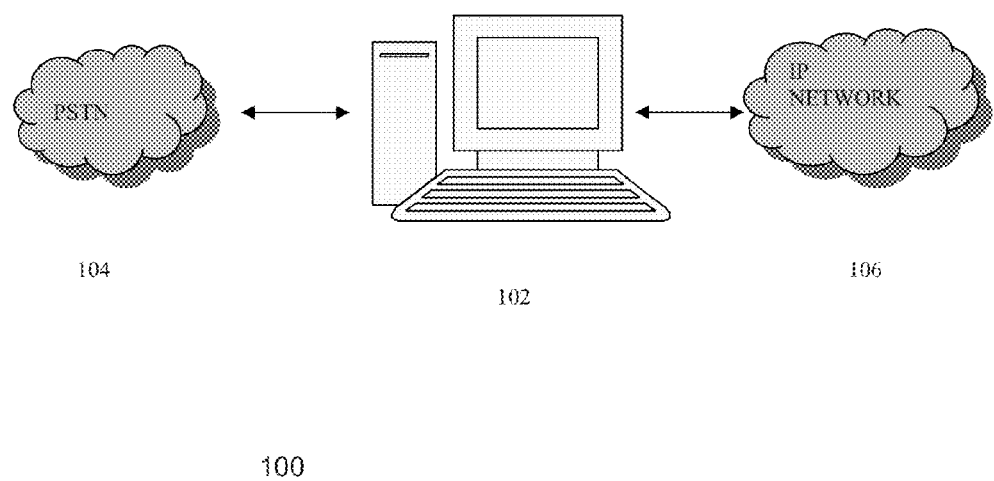
FIG. 1 illustrates a representative network environment for implementing a method of determining channel utilization in a gateway, according to an embodiment.

As mentioned earlier, a gateway is used to facilitate flow of data (audio, video, etc.) between diverse networks. Gateways are typically installed between edges of diverse networks and are akin to network nodes that are equipped to interface with networks that use different protocols. Thus a gateway installed between a voice network such a PSTN and an IP-based data network would act as a facilitator between the two networks ensuing free flow of data. In the network for an enterprise, a computer server may act as gateway. A gateway is an essential feature of most routers, although other devices (such as any PC or server) can function as a gateway.

There's also a specific form of gateway termed the media gateway. A media gateway is a translation device or service that converts digital media streams between different communications networks. They convert multimedia provided in one type of network to a form required in another network. Multimedia gateways enable multimedia communications over multiple transport protocols such as Asynchronous Transfer Mode (ATM) and Internet Protocol (IP). The term "media gateway" may also mean to include different hardware devices that enable communication between diverse networks.

In a managed server environment, gateways may connect an IP network to a PSTN network by enabling voice calls between the two networks. Voice calls from an IP network to a PSTN network and vice versa go through gateways. These gateways have 'DS1' interfaces that contain 'DS0' channels to carry voice calls. For the sake of clarity, Digital Signal 0 (DS0) is a basic digital signaling rate of 64 kbit/s, corresponding to the capacity of one voice-frequency-equivalent channel. And Digital signal 1 (DS1) is a widely used standard in telecommunications to transmit voice and data between devices.

Typically, a signaling channel is used while call is being established. Once established, voice data packets flow through a bearer channel, keeping it occupied for the call duration. As soon as the call is over, the bearer channel becomes idle until it is occupied again in another voice call. A channel is in use when it is carrying voice data packets in a call. On other times it remains in idle state, available for a new call. When all or most of the channels in an interface are constantly in use then new calls may start getting dropped in absence of idle channel availability. On the other hand if channels remain in idle state for long then it results into ongoing wastage of configured resources capacity. In either case if an administrator is made aware of such trends in a network, corrective measure can be taken to ensure optimum utilization of available resources.

Embodiments of the present solution provide a method of optimizing channel utilization in a gateway, such as a media gateway. The method provides information regarding channels utilization per interface in a gateway and enables a user (for instance, an administrator) to perform capacity planning for a network.

FIG. 1 illustrates a representative network environment for implementing a method of determining channel utilization in a gateway, according to an embodiment.

In an example, the representative network environment 100 includes a computing system 102 connected to a public switched telephone network (PSTN) 104 and IP network 106. The computing system 102 may connect to a public switched telephone network (PSTN) 104 and/or IP network 106 via wired (a cable) or wireless (such as Wi-Fi) communication means. The communications means are used to exchange data and/or signals between the computing system 102 and networks 104, 106.

The computing system is described in detail below with reference to FIG. 2.

Public switched telephone network (PSTN) 104 is the network of the global public circuit-switched telephone networks. The PSTN is a circuit-switched network. A dedicated circuit (also referred to as a channel) is established for the duration of a transmission, such as a telephone call. Originally a network of fixed-line analog telephone systems, the PSTN is now almost entirely digital and includes mobile as well as fixed telephones.

IP network 106 or an Internet Protocol-based network is a group of hosts that share a common physical connection and use Internet Protocol for network layer communication. All computers within an IP network have an IP address that uniquely identifies that individual host. An IP network IP uses a packet-switched architecture, in which data are broken up into smaller "packets," with each packet containing a source address and destination address. IP packets are handed over to a data link layer protocol, such as Ethernet, for the actual, physical transmission to the next node in the network path.

In an example, the computing system 102 may connect to the PSTN 104 and IP network 106 through a gateway, such as, but not limited to, a Sangoma gateway.

Figure 2:
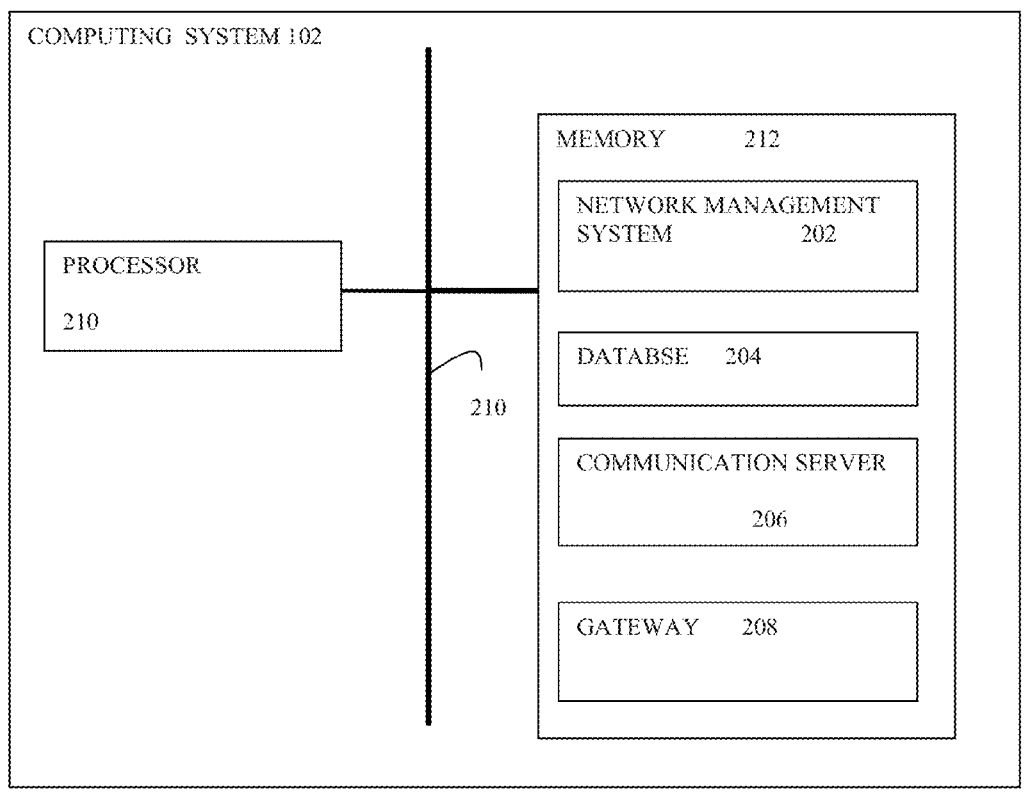
FIG. 2 shows a block diagram of a computing system of FIG. 1 for implementing a method of determining channel utilization in a gateway, according to an embodiment.

FIG. 2 shows a block diagram of a computing system of FIG. 1 for implementing a method of determining channel utilization in a gateway, according to an embodiment.

In an example, the computing system 102 is a computer server (the term including both computer hardware and software (machine executable instructions)). Other examples of the computing system 102 may include a desktop computer, a notebook computer, a laptop computer, a net book computer, a touch pad computer, a personal digital assistant (PDA), a mobile device, and the like.

In an example, the computing system 102 may include a network management program 202 (machine readable instructions), such as, but not limited to Network Node Manager (NNMi) from Hewlett-Packard (HP). Generally speaking, a network management program is responsible for monitoring a network(s) performance. NNMi from HP helps an administrator keep an eye on a monitored network, find issues, recognizes outages related to a network, and helps improve a network's availability and performance. It can automatically discover a network, recognize network devices and their configuration, and draw an IP map. NNMi can monitor performance parameters such as interface errors, CPU load, etc. and also provide network inventory detailed data about devices that were either loaded during discovery or input manually by an NNMi operator as a custom attribute.

In an example, the features of the NNMi program can be enhanced by installing an iSPI (Smart Plugs-ins) program. iSPI is a Smart Plugin, which can be installed on top of the NNMi for feature expansion. SPIs use NNMi's discovered nodes and their configuration as a primary source of information. HP NNMi iSPI for IP telephony (a Smart Plugin) provides discovery and monitoring for the IP telephony infrastructure including gateways, gateway end points and channels, gatekeepers, and IP phones. It extends the capability of NNMi to monitor and manage the IP telephony infrastructure in a network environment. It also provides a diagnostic and monitoring solution for both telecom and data teams to improve efficiency.

In an example, a default database 204 is installed along with an implementation of NNMi on computing system 102. In another instance, however, an external database, for example, an Oracle database, may be installed to store data (such as NNMi data).

In an example, if the computing system 102 monitors a communications server environment 206, such as, but not limited to, Microsoft Lync server, relevant application modules may also be installed on the device. For example, in case of Microsoft Lync server environment, Microsoft .NET Framework 3.5 (or higher), Microsoft Power Shell 2.0, etc. may need to be installed along with the NNMi management server.

In an example, the computing system 102 may include a gateway (hardware and/or software) 208 such as, but not limited to, a Sangoma gateway, to connect to a PSTN and an IP network.

Computing system 102 may include a processor 210, for executing machine readable instructions, and a memory (storage medium) 212, for storing machine readable instructions (such as, programs 202, 206 and database 204). In an example, the computing system 102 may also include a display. These components may be coupled together through a system bus 210.

Processor 210 is arranged to execute machine readable instructions. The machine readable instructions may be in the form of computer programs 202, 204, 206, 208 for executing a number of processes. In an example, the processor executes machine readable instructions stored in the memory 212 to retrieve voice call entries from a database associated with the gateway, wherein the voice call entries correspond to voice calls handled by the gateway; determine, for each voice call entry, whether a gateway channel was used during a voice call; determine for a voice call entry, for which a gateway channel was used, whether the voice call is completed or active; if the voice call is completed, determine channel name used in the voice call and channel usage duration of the voice call since last channel utilization determination; map the channel name with the channel usage duration and storing the mapping in the database; if the voice call is active, determine channel name used in the voice call and channel usage duration of the voice call since last channel utilization determination; and map the channel name with the channel usage duration and storing the mapping in the database.

The memory 212 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 212 may include computer programs, such as, but not limited to, a network management system 202, a database 204, a communication server 206 and a gateway 208.

The system components depicted in FIG. 2 are for the purpose of illustration only and the actual components may vary depending on the computing system and architecture deployed for implementation of the present solution. The various components described above may be hosted on a single computing system or multiple computer systems, including servers, connected together through suitable means.

Figure 3:
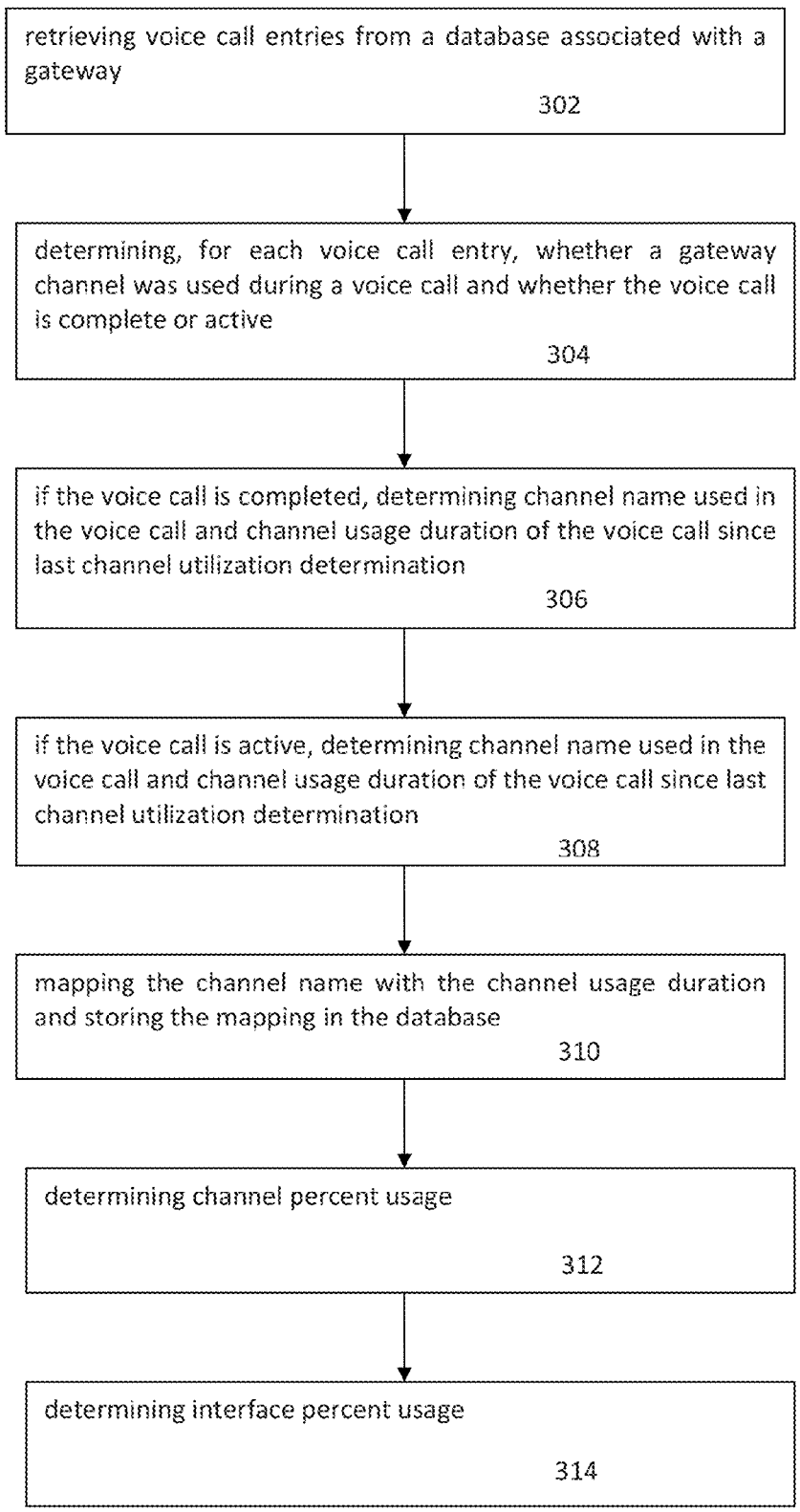
FIG. 3 shows a flow chart of a method of determining channel utilization in a gateway, according to an embodiment.

FIG. 3 shows a flow chart of a method of determining channel utilization in a gateway, according to an embodiment.

The method may be implemented in an environment, such as, but not limited to, the representative network environment depicted in FIG. 1. The method may be implemented on the computing device of the network environment.

In the representative network environment example, the computing system 102 connects to the PSTN 104 and IP network 106 through a Sangoma gateway. The computing system includes a network management program (such as NNMi) and a NNMi SPI for IP Telephony plug-in for monitoring a communication server environment, such as Microsoft Lync Server environment. In Lync Server environment, whenever there is a voice call to or from the PSTN network, it gets recorded in Sangoma gateway's mib (management information base) database (GwCallStats-MIB). Each call has its unique entry in mib table (gwCallDetailTable) with detailed information on call attributes. The mib table maintains call entries for all active calls and calls ended in last 60 minutes.

As mentioned earlier, gateways have 'DS1' interfaces that contain 'DS0' channels to carry voice calls. A signaling channel is used while call is being established. Once established, voice data packets flow through a bearer channel, keeping it occupied for the call duration. As soon as the call is over, the bearer channel becomes idle until it is occupied again in another voice call. A channel is in use when it is carrying voice data packets in a call. On other times it remains in idle state, available for a new call.

In an example, the method proposed in this disclosure is used to calculate channels utilization or time for which a channel was either in 'In Use' or in 'Idle' state in last n minutes. Repetitive run of the algorithm over a period of time provides channels usage trend and hence enables administrator to take an informed decision on capacity planning.

A subset of mib variables from each call entry is used in channel usage calculation:

gwCallSourcePath and gwCallDestinationPath provide name of channel used in call.

gwCallStartTime registers call start time.

gwCallDurationInSeconds provides call duration of a completed call (not of an active call)

gwCallStatus and gwCallTerminationReason are used to determine if the entry is for a completed call or an active call.

In block 302, voice call entries are retrieved from a database associated with a gateway. The voice call entries correspond to voice calls handled by the gateway.

All voice call entries or records (callEntries) are retrieved from gwCallDetailTable mib database table of the gateway. Each entry stands for a call that is either active or has ended in last 60 minutes. At the time of retrieving call entries the current system time stamp (currTimeStamp) is recorded. In addition, the time stamp when the channel(s) usage was last computed (preTimeStamp) is retrieved from the network management system (NNMi in the present example) database.

In block 304, for each voice call entry, a determination is made whether a gateway channel was used during a voice call. If a gateway channel was used for a voice call entry, it is also determined whether the voice call has completed or is still active.

For each call entry (callEntry) in callEntries, the following actions are performed.

a. Mib variables gwCallSourcePath(callSrcPath) and gwCallDestinationPath(callDestPath) are read.

b. These variables (callSrcPath and callDestPath) are parsed to verify if it starts with 'DS0'. If the answer is yes, it indicates use of channel in call.

If none of the variables starts with 'DS0' then next callEntry is taken up for evaluation and steps (a) and (b) are repeated.

c. If for a callEntry, variables (callSrcPath and/or callDestPath) is/are verified to start with 'DS0', the following mib variables are read: gwCallStartTime (callStartTime), gwCallDurationInSeconds (callDuration), gwCallStatus (callStatus) and gwCallTerminationReason (callTermReason).

Variables callStatus and callTermReason are used to determine if the call has completed or is still active.

d. If it is a completed call, for each path(callSrcPath, callDestPath), the following actions are performed.

(i) If path starts with 'DS0', it is parsed to obtain the name of channel used in call, which is then stored in chName variable.

(ii) Determine the duration of time for which a channel was occupied in the call since the last channel(s) usage computation.

Figure 4:
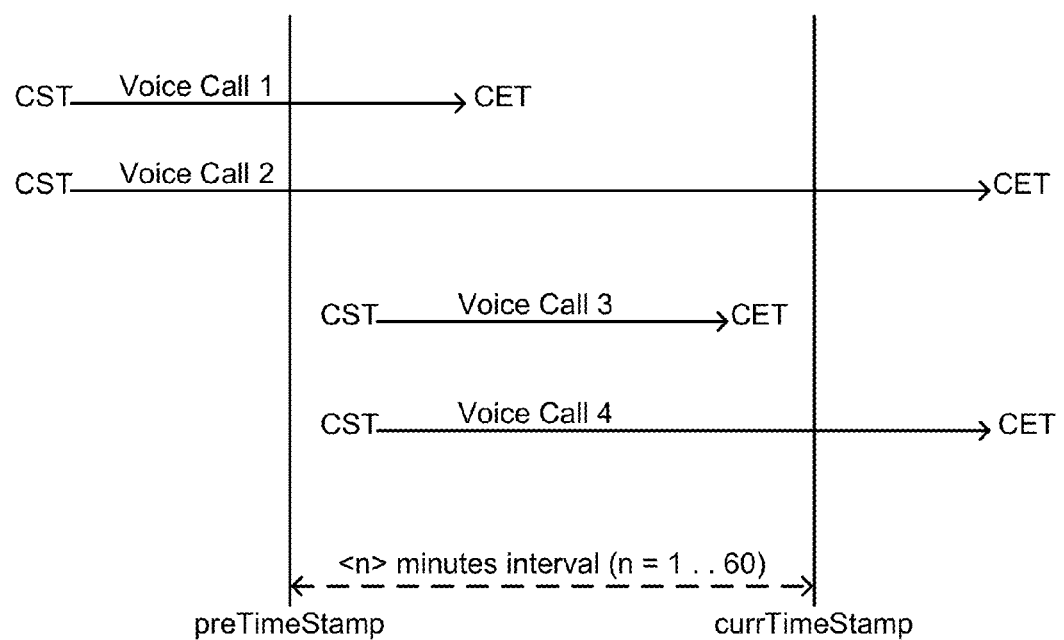
FIG. 4 shows an illustrative series of voice calls over a period of n minutes handled by a gateway, according to an embodiment.

If callStartTime<preTimeStamp (Voice Call 1 in FIG. 4), then call end time is determined as callEndTime=callStartTime+call Duration If callEndTime>preTimeStamp, then channelUsageDuration=callEndTime−preTimeStamp (Voice Call 3 in FIG. 4)

Else, channel usage is equal to the call duration i.e. channelUsageDuration=callDuration (iii) Store channel usage from this call in a data structure (channelUsage). This data structure maps chName to channelUsageDuration. If new, the channel entry is created in the data structure. If it is already present, the channel entry with its usage is updated in the data structure.

In other words, if the voice call has completed, the channel name used in the voice call and channel usage duration of the voice call since last channel utilization determination are determined (block 306). Subsequently, the channel name is mapped to the channel usage duration and the mapping is stored in the database.

e. If it is an active call, for each path (callSrcPath, callDestPath), the following actions are performed.

(i) If path starts with 'DS0', it is parsed to obtain the name of channel used in call, which is then stored in chName variable.

(ii) Determine the duration of time for which a channel was occupied in the call since the last channel(s) usage computation.

If callStartTime<=preTimeStamp (Voice Call 2 in FIG. 4), it means the channel has been in use since determination of channel usage.

channelUsageDuration=currTimeStamp−preTimeStamp

Else (Voice Call 4 in FIG. 1), channelUsageDuration=currTimeStamp−callStartTime iii. Store channel usage from this call in a data structure (channelUsage). This data structure maps chName to channelUsageDuration. If new, the channel entry is created in the data structure. If it is already present, the channel entry with its usage is updated in the data structure.

In other words, if the voice call is still active, the channel name used in the voice call and channel usage duration of the voice call since last channel utilization determination are determined (block 308). Subsequently, the channel name is mapped to the channel usage duration and the mapping is stored in the database.

Once the above actions (a, b, c, d and e) are completed for a call entry, the same actions are repeated for the next call entry, and so and so forth for remaining call entries.

Once all call entries callEntries have been iterated through actions mentioned in block 306 and 308, a data structure channelUsage is created which maps channel name to its usage duration in last "n" minutes interval (block 310). In an example, the "n" minutes are equal to 60.

In block 312, channel percent usage is calculated. For every mapping in channelUsage, the following actions are performed.

a. Channel usage duration is retrieved.

b. Percent usage is determined by dividing usage duration to time elapsed since last determination of channel usage (time difference between currTimeStamp and preTimeStamp).

c. Corresponding channel is retrieved from the network management system (NNMi in the present example) database update with percent usage.

In block 314, interface percent usage is calculated. To calculate interface percent usage, list of 'DS1' interfaces is retrieved from the network management system database and stored in ifaceList. For each element in ifaceList, the following actions are performed.

a. List of 'DS0' channels is retrieved from the network management system database and stored in chList.

b. Sum of individual channel's percent usage is calculated by iterating though chList.

d. Above sum is divided by number of channels in chList. This provides average interface percent usage since last determination of channel usage.

e. Corresponding interface in network management system database is updated with percent usage Once the above actions are completed, the network management system database gets updated with channels percent usage and interface percent usage.

Now, the time stamp of last channel usage computation is updated to currTimeStamp. And the actions mentioned in blocks 302 to 314 are repeated after user configured time of "n" minutes, where n may range from 1 to 60. This provides channel and interface usage for elapsed "n" minutes.

In an example, the proposed method maintains a data structure (processedCalls) of calls which have been processed once. It ensures that every call reported by gwCallDetailTable is accounted only once while calculating channel usage. The mib table maintains entries of all calls either active or ended in last n minutes. Therefore, if n=60 minutes, if the method is implemented 10 times in 60 minutes (after every 6 minutes), same call may get reported 10 times. The processedCalls data structure marks a call once it is processed and thus avoids repetitive processing in successive implementation of the solution. In addition, in every implementation, processedCalls is cleared off of call entries which ended before 60 minutes and hence no longer reported by the mib table. This exercise keeps the processedCalls data structure from growing infinitely and improves efficiency.

Since channels and interface usage monitored over a period of time provide their usage trend, an administrator can analyze the same and take an informed decision on capacity planning. If channels and interface usage is on higher side or approaching towards 100% utilization, administrator can react by adding more ds1 interfaces to avoid any call drop. If channels and interface usage is quite low and there are multiple such ds1 interfaces then administrator can re-configure few of ds1 interfaces somewhere else where more ds1 interfaces are required to avoid call drops. It maximizes the available resources utilization. In addition, channels and interfaces usage data can be provided to reporting tool to store for historic purposes.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

I claim:

1. A computer-implemented method of determining channel utilization in a gateway, comprising:
    retrieving voice call entries from a database associated with the gateway, wherein the voice call entries correspond to voice calls handled by the gateway;
    determining, for each voice call entry, whether a gateway channel was used during a voice call;
    determining, by a processor, for a voice call entry, for which a gateway channel was used, whether the voice call is complete or active;
    if the voice call is complete, determining channel name used in the voice call and channel usage duration of the voice call since last channel utilization determination;
    mapping the channel name with the channel usage duration and storing the mapping in the database;
    if the voice call is active, determining channel name used in the voice call and channel usage duration of the voice call since last channel utilization determination; and
    mapping the channel name with the channel usage duration and storing the mapping in the database.

2. A computer-implemented method according to claim 1, wherein the voice call entries include entries for active calls and/or completed calls in n minutes.

3. A computer-implemented method according to claim 2, wherein the n minutes are user defined.

4. A computer-implemented method according to claim 1, further comprising, for each mapping stored in the database:
    retrieving the channel usage duration;
    determining channel percent usage by dividing the channel usage duration to time elapsed since last channel utilization determination; and
    updating corresponding channel in the database with the channel percent usage.

5. A computer-implemented method according to claim 4, further comprising, determining interface percent usage by:
    retrieving a list of DS1 interfaces from the database;
    for each DS1 interface:
    retrieving a list of DS0 channels from the database;
    determining sum of individual channel's percent usage by iterating through the list of DS0 channels;
    dividing aforesaid sum by number of channels in the list of DS0 channels to find average interface percent usage since last channel utilization determination.

6. A computer-implemented method according to claim 5, further comprising updating the database with channel percentage usage and the interface percent usage.

7. A computer-implemented method according to claim 1, wherein the database is a MIB (management information base) database.

8. A computer-implemented method according to claim 1, wherein the gateway is a media gateway.

9. A computer-implemented method according to claim 1, wherein the gateway channel is a DS0 channel.

10. A system for determining channel utilization in a gateway, comprising:
    a processor; and
    a memory for storing machine readable instructions, wherein the processor executes the machine readable instructions to:
    retrieve voice call entries from a database associated with the gateway, wherein the voice call entries correspond to voice calls handled by the gateway;
    determine, for each voice call entry, whether a gateway channel was used during a voice call;

determine, for a voice call entry for which a gateway channel was used, whether the voice call is complete or active;

if the voice call is complete, determine a channel name used in the voice call and channel usage duration of the voice call since last channel utilization determination;

map the channel name with the channel usage duration and storing the mapping in the database;

if the voice call is active, determine channel name used in the voice call and channel usage duration of the voice call since last channel utilization determination; and map the channel name with the channel usage duration and storing the mapping in the database.

11. The system of claim 10, wherein for each mapping stored in the database, the processor executes machine readable instructions to:

retrieve the channel usage duration;

determine channel percent usage by dividing the channel usage duration to time elapsed since last channel utilization determination; and update corresponding channel in the database with the channel percent usage.

12. The system of claim 10, wherein to determine interface percent usage, the processor executes machine readable instructions to:

retrieve a list of DS1 interfaces from the database;

for each DS1 interface:

retrieve a list of DS0 channels from the database;

determine sum of individual channel's percent usage by iterating through the list of DS0 channels; and divide aforesaid sum by number of channels in the list of DS0 channels to find average interface percent usage since last channel utilization determination.

13. The system of claim 10, wherein the voice call entries include entries for active calls and/or completed calls in n user defined minutes.

14. The system of claim 10, wherein the gateway channel is a DS0 channel.

15. An apparatus comprising:

a non-transitory computer readable medium comprising instructions executed by a processor to:

retrieve voice call entries from a database associated with a gateway, wherein the voice call entries correspond to voice calls handled by the gateway;

determine, for each voice call entry, whether a gateway channel was used during a voice call;

determine, for a voice call entry for which a gateway channel was used, whether the voice call is complete or active;

if the voice call is complete, determine channel name used in the voice call and channel usage duration of the voice call since last channel utilization determination;

map the channel name with the channel usage duration and storing the mapping in the database;

if the voice call is active, determine channel name used in the voice call and channel usage duration of the voice call since last channel utilization determination; and map the channel name with the channel usage duration and storing the mapping in the database.

* * * * *